Oct. 7, 1958

J. SVINGOR ET AL 2,854,957

REGULATING DEVICE FOR SERVO-MOTORS, ESPECIALLY
FOR CONTROLLING MACHINE TOOLS

Filed July 18, 1956

INVENTORS
JENO SVINGOR
JENO BARATOSSY

BY Young, Emery & Thompson

ATTORNEYS

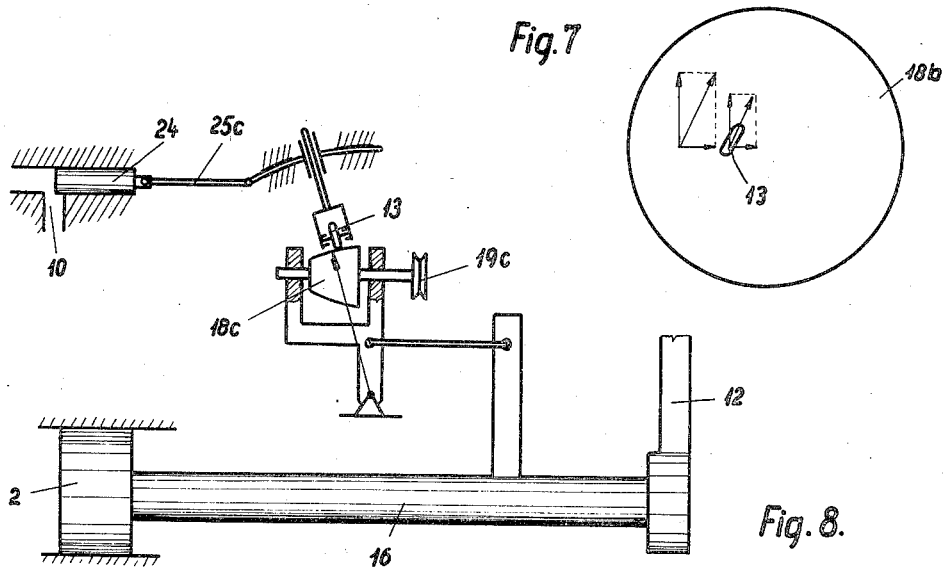
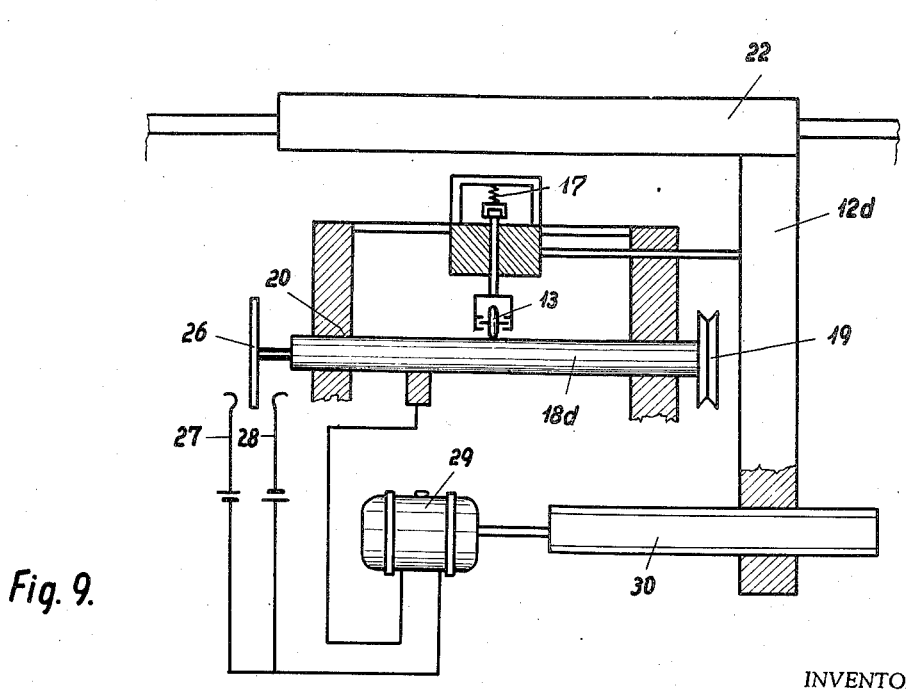

United States Patent Office 2,854,957
Patented Oct. 7, 1958

2,854,957

REGULATING DEVICE FOR SERVO-MOTORS, ESPECIALLY FOR CONTROLLING MACHINE TOOLS

Jeno Svingor and Jeno Baratossy, Budapest, Hungary, assignors to Licencia Talalmanyokat Ertekesito Vallalat, Budapest, Hungary, a Hungarian enterprise Application July 18, 1956, Serial No. 598,551

2 Claims. (Cl. 121—45)

The present invention relates to a regulating device for servo-motors for regulating such motors in such a way that they move uniformly or with the desired speed. Such devices are already known but they are complicated and expensive. The main object of the invention is to simplify the construction of such regulating devices. A further object of the invention is to regulate continuously and easily the speed of the machine from an extreme positive value to an extreme negative value including the starting and stopping of the machine, in such a way that only small forces are generated. This is advantageous from the point of view of manual operation as well as of automatic function.

The above mentioned objects are attained according to the invention by the use of a pulley rolling on a rotating drum in such a way that one of these two parts is moved axially by the servo-motor; thus a frictionless movement is only possible if the pulley is set in a certain inclined position, the inclination of which is determined by the resultant of the said axial speed and the circumferential speed of the drum. Now, if one of these two speeds or both are changed, the frictional force produced between the drum and the pulley causes an axial shifting of the drum or of the pulley and these movements are employed to regulate the power of the servo-motor in such a way that the original or the desired speed is restored.

The enclosed drawings illustrate some preferred embodiments of the invention shown by way of example. In Figs. 1 to 4 a regulating device is shown in which a hydraulically operated servo-motor is employed to produce the feeding movements of a machine tool and Figs. 5 to 9 show modified forms of the device.

Fig. 7 is the plan view of a part belonging to the device according to Fig. 6.

Fig. 8 shows a still further modification of the hydraulic regulating devices according to the invention, and Fig. 9 is the schematic sectional view of an electric servo-motor regulated according to the invention.

Figure 1:
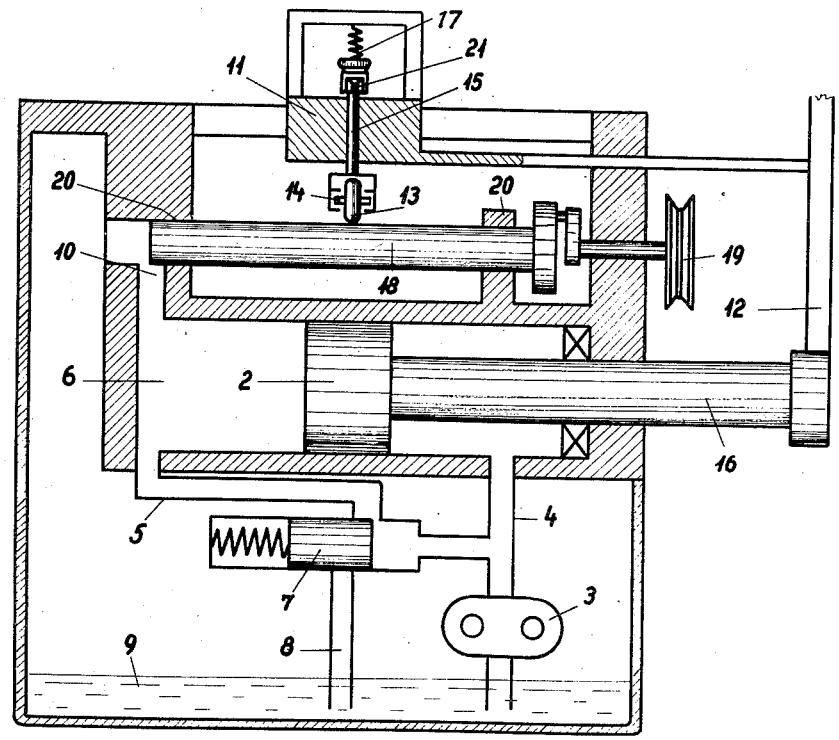
Fig. 1 is a schematic vertical section of the whole regulating device.
Figure 2:
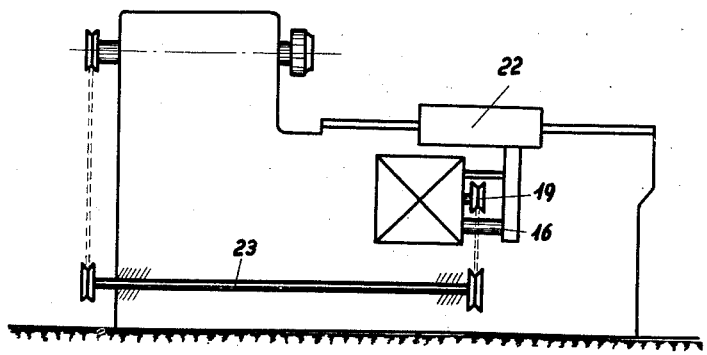
Fig. 2 is the schematic side view of a lathe provided with the regulating device according to the invention, this device being shown on a smaller scale.

According to Figs. 1 to 4 the servo-motor is used to produce the feeding movement of a lathe and is composed of a double-diameter or differential piston 2 moved in its cylinder 1 receiving oil under pressure from a pump 3 through pipe 4 in order to move the piston from the right to the left. The same pump delivers oil by means of a pipe 5 into space 6 for moving the piston to the right, and, as it is well known, a much lower pressure is needed for this latter movement, since the left hand surface of the piston is larger than the right one. As shown in Fig. 2 the piston moves the tool post of a lathe in such a way that its rod 16 is connected by means of a further rod 12 to the said tool post 22.

The pressure in space 6 is adjusted by means of a spring-controlled valve 7 which throttles the oil in a well-known manner, and in its open position allows the oil to flow back through pipe 8 into the oil sump 9. The oil flowing upwards through pipe 5 streams through an adjustable opening 10 and then back to the sump 9. The most important task of valve 7 is, as it is well known per se, to keep the pressure on the right side of piston 2 on a constant value, because thus the pressure changes on the left side may have the desired effect. In fact, if the pressure on the right side of the piston decreases, valve 7 is moved to the right by its spring and thus the stream of the oil is more throttled, that is to say, its pressure increases and vice versa. At the same time this valve is a safety valve because if the pressure rises to a very high value, the valve is shifted to the left for such an extent, that the oil is enabled to return through pipe 8 directly into the oil sump 9.

On the upper part of the device there is a bearing block 11 guided parallelly to the movement of the piston, and it is connected to the piston by means of rods 16 and 12. In the block 11, moving thus together with the piston 2, there is a pivotally mounted pulley 13 which may be turned, together with its shaft 14, around a vertical bolt 15. After turning the pulley 13 around this bolt it can be fixed in the adjusted position by any known means, for example by friction, not shown in the drawing.

The pulley 13 is pressed by means of a spring 17 to a rotating drum 18, driven by a belt pulley 19. In the form represented the main shaft of the lathe drives this belt pulley 19 by means of an intermediate shaft 23 (see Fig. 2). The drum 18 is connected to its driving means in such a way that it may move in its bearings 20 in an axial direction. The left hand end of the drum as shown in Fig. 1 forms a slide adapted to cover up, in whole or in part, the said opening 10, so that said drum regulates said opening by an axial shifting movement.

Figure 3:
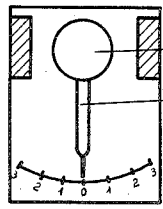
Fig. 3 is the plan view, on a larger scale, of a detail.
Figure 4:
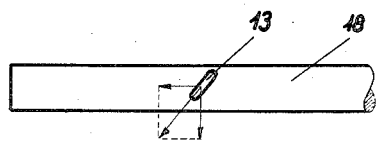
Fig. 4 is the plan view of the said drum and of the pulley rolling on it, showing the speed of the latter as a resultant of the axial movement and of the circumferential speed.

When the pulley 13 and its pivot 14 turn around bolt 15 that is to say during the adjusting of the pulley in an inclined plane, the pointer 21 moves along a scale shown in Fig. 3 and the pulley is fixed after such an adjustment by any known means.

For an easy understanding of the function of this device let us first examine the steady state operation. This may be as follows:

In the position of the drum 18 corresponding to the steady state operation, the hydraulic fluid streams out of space 6 through the opening 10, so that the pressure in this space 6 is so low that the piston 2 moves according to Fig. 1 from the right to the left and the tool post 22 of the lathe is also moved in this direction. At the same time the bearing block 11 is also moved to the left, and the main shaft of the lathe drives the drum 18, on which the pulley 13 rolls. This pulley has been set in the position shown in Fig. 4 in such a way that its plane of rotation corresponds to the turning speed of drum 18 and to the shifting speed of block 11, because the resultant of this latter speed and of the circumferential speed of drum 18 is situated within the said plane of rotation, that is to say within the central plane of pulley 13. In such a way the pulley rolls without any friction or gliding on the drum and the drum does not move in axial direction.

Thus, in this steady state operation the movement of the piston 2, of block 11 and of the tool post 22 is uniform and the dimension of the opening 10 as adjusted by the drum 18 does not change, so that the pressure of the oil on the two sides of the piston 2 is also unchanged.

If now the speed of the main shaft of the lathe is changed by any reason, the feed too should be changed, as it is intended to move the tool post 22 by the same length for every revolution of the main shaft. In other words, for greater speeds of the main shaft a greater feed is necessary and vice versa. This is attained by the device according to the invention in such a way that if the speed of the main shaft is changed, the speed of drum 18 is also altered and consequently the resultant shown in Fig. 4 changes its direction that is to say it is no longer parallel with the plane of rotation of the pulley. Thus, friction is produced between the pulley and the drum, such friction shifting the drum in the direction of its axis and thus altering the width of opening 10. In such a way, if the R. P. M. of the main shaft of the machine tool increases, the drum is moved to the right, the opening 10 is enlarged and the pressure in space 6 is lowered, so that the movement of the piston becomes faster. On the contrary, if the drum 18 rotates slower, opening 10 becomes narrower and the piston moves slower. In such a way the regulating is done in the desired manner, because the speed of the servo-motor is always proportional to the speed of the machine belonging to it.

The force generated in an axial direction by the pulley 13 may be very small but as the drum continuously moves in its bearing 20, according to the well known law of friction this drum can be moved axially by very small forces. Experience has shown that the device described in the foregoing is surely suitable for regulating in the desired manner.

In addition, the device is suitable for regulating itself, that is to say, if the piston 2 is moved, by any reason, faster or slower than the prescribed speed, the device immediately restores the prescribed speed. Namely, if the piston and thus the bearing block 11 too move faster or slower than the prescribed speed, the resultant speed shown in Fig. 4 again turns out of the plane of pulley 13 and thus again frictional force is generated on the circumference of the drum which is being shifted to the right or to the left for altering the opening 10 and for altering the oil pressure in the desired manner. Thus the original speed is restored. For example if the piston 2 moves too fast, the drum 18 is moved axially according to the difference in the speed. If the movement was directed to the left, thus the throttling is stronger and the pressure in space 6 is increased, so that the speed is decreased; if the movement was directed to the right, the throttling is lessened, the said pressure is decreased and the speed of the piston 2 is increased.

When the piston reaches the end of its stroke, the device is manually stopped and it is set for moving in the opposite direction, for which purpose the pulley 13 is adjusted into the opposite inclination, but otherwise the method of reversing the speed of the machine does not belong to the invention and may be, of course, automatical.

It is understood that during the function of the device the plane of rotation of pulley 13 is always inclined, that is to say it is not perpendicular to the axis of rotation of drum 18. If the pulley is not set in an inclined position (Fig. 4) but into the central or neutral position according to Fig. 3, a frictionless rolling is only possible if the piston 2 does not move and the pulley 13 is not shifted in a crosswise direction to its plane of rotation. If the pulley is moved from an inclined position into the central position so that the pointer 21 reaches point 0 of the scale (Fig. 3), the drum 18 is shifted in such a way that the pressures on the two sides of the piston 2 produce equal forces and the piston is stopped. If, however, the pulley is turned around bolt 15 and along the scale belonging to the pointer 21, the piston 2 and the parts connected to it are started and move in a direction and with a speed corresponding to the position chosen for the plane of rotation of the pulley.

Figure 5:
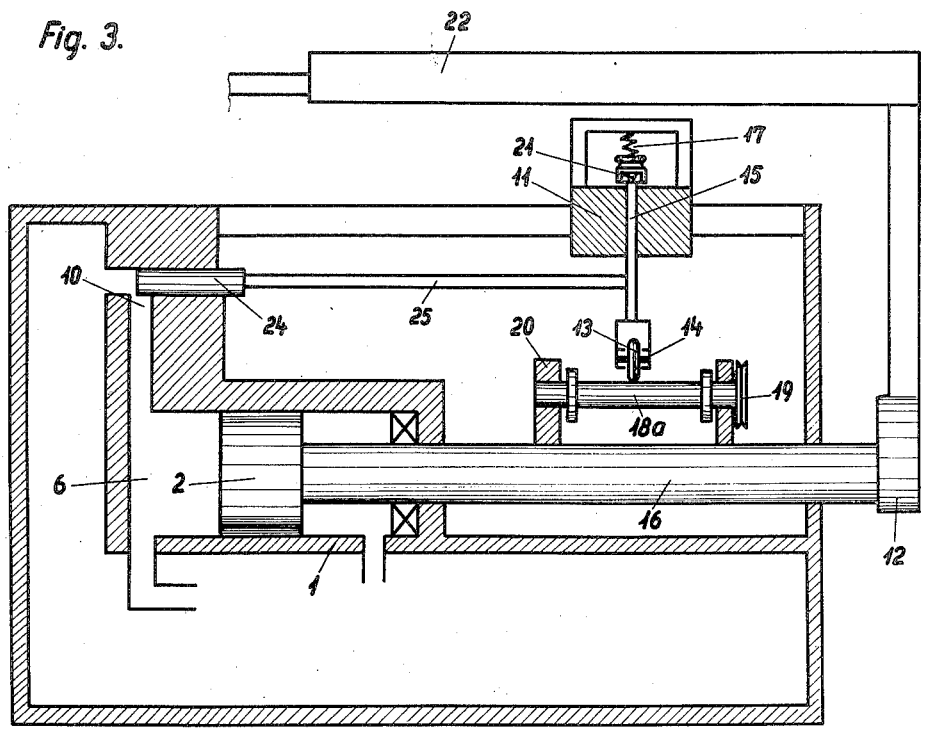
Fig. 5 is a schematic vertical section of a modified form of the invention.

The device shown in Fig. 5 is similar to that represented in Figs. 1 and 2, the substantial difference being that the piston rod 16 does not move the pulley in its guide but shifts the drum which in this form of the invention is marked by reference number 18a. Thus the shifting movement crosswise to the plane of rotation of the pulley 13, produced by the servo-motor, is not performed by the pulley itself, but by the drum on which it rolls. However, as the function of the other parts of the device is similar to that of the corresponding parts described in the foregoing, these parts are marked in Fig. 5 by identical or corresponding reference numbers, but there is an additional part, the slide valve 24 which regulates the opening 10 and is moved by the pulley 13, by the mediation of a rod 25.

The oil pump and the parts belonging to it are not shown in Fig. 5, as they are identical with those illustrated in Fig. 1.

The function of the device according to Fig. 5 is the following:

In the steady state operation the circumferential speed and the shifting movement of the drum 18a produces a resultant speed which is within the plane of rotation of pulley 13, but if the turning and/or shifting movement of the drum is altered, friction is produced between the parts 13 and 18a as explained above, so that the pulley is shifted in its guide and the slide 24 is pushed or pulled by means of rod 25. Thus the pressure of the oil is changed in the desired way. Instead of a slide 24 another closing member, say a valve may be used as well, and, of course, in the device shown in Fig. 1 it is also possible to use a separate closing member as shown in Fig. 5 for regulating the opening 10, so that not the drum 18 itself adjusts the opening but this drum moves the said separate closing device.

Figure 6:
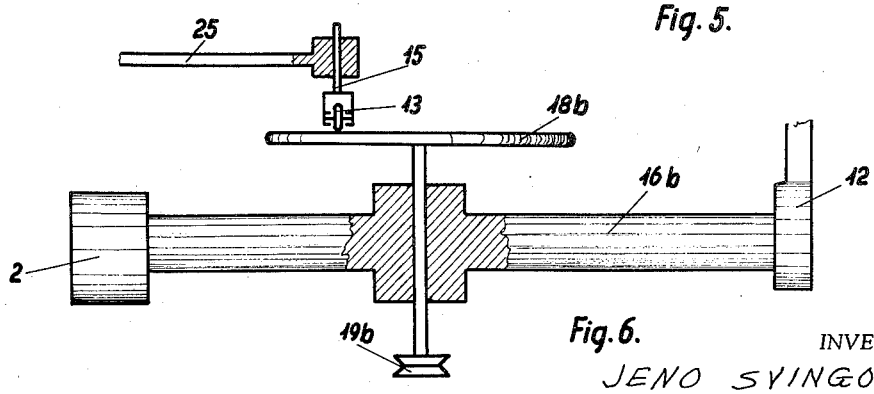
Fig. 6 shows some important parts of a further modification.

According to Fig. 6 the drum on which the pulley 13 rolls has the shape of a disk 18b and this disk is rotated by means of a belt pulley 19, at the same time the disk being shifted by the piston rod 16b. Thus, in this embodiment of the invention too, the piston 2 of the servo-motor does not move the pulley but shifts the drum. In this form of the invention the pulley 13 rolls in the said inclined position and during this rolling it continually moves radially along the disk. If the pulley is set into the position shown in Fig. 7, it is shifted outwards that is to say towards the circumference of the disk and at an opposite inclination it moves towards the centre.

It may thus be clearly understood that the term "drum" means in this specification and in the appended claims any rotating body on which a pulley may roll.

In the form shown in Fig. 6 the pulley 13 continuously moves, by means of the connecting rod 25, the slide 24 not shown in Fig. 6, consequently the speed produced by this device is not uniform but will be continuously changing in the desired manner.

Fig. 7 illustrates the vector diagram of the speeds, and shows that as the pulley moves towards the circumference of the disk so that it engages the parts of the disk moving with an increasing speed, the shifting movement too is increased, so that the pulley is shifted substantially parallelly with its own plane of rotation. This is due to the fact that when a slight increase of the circumferential speed produces a small friction between the disk and the pulley, the rod 25 and the slide 24 are immediately shifted further, and so the change in the oil pressure causes a change in the speed of the hydraulic piston. Thus the two vector speeds change together.

In Fig. 8 again an embodiment of the invention is shown in which the hydraulic piston 2 moves the pulley 13 as in Fig. 1, but this pulley rolls on a conically curved, barrel-shaped drum 18c, as compared to the cylindrical drum of Fig. 1. Accordingly, the drum does not move to and fro along a straight line, but is guided along a curved path, according to Fig. 8 in such a way that it may turn around a fixed pivot. The centre of the path of the drum is identical with the centre of the arch forming the outline of the drum. In order to ensure the proper function of this device the pulley 13 too is guided along a circular arch, the center of which is in the axis of the pivot of the drum. The function is substantially the same as according to Fig. 1, but as the pulley is moving along a curved path, not a uniform, but a changing speed is produced. According to the desired alteration of the speed the shape of the drum 18c may be, of course, not only circular but of any other curve or straight line on which rolling is possible.

It is understood that not only hydraulic servo-motors can be regulated according to the invention, but other sources of power may be used without difficulty. So for example electric motors can be regulated according to the invention. Fig. 9 shows that the servo-motor may be an electrical one, instead of hydraulic motors described above. In the form shown in Fig. 9 a device is shown in which the servo-motor moves the tool post 22 of a machine tool in such a way that an electric motor 29 drives a screw bolt 30 which turns in a nut 12d fixed to the tool post 22. In accordance with the direction of rotation of the screw bolt 30 the tool post moves to the left or to the right. The regulating device itself is similar to that shown in Fig. 1, inasmuch as the electrical servo-motor shifts by means of a rod 12d the pulley 13 in its guide, and this pulley rolls on a drum 18d driven by the machine tool. Thus, the drum is moved axially in its bearings 20 as a result of the friction described in connection with the other forms of the invention, this shifting movement being used to regulate the power of the servo-motor. For this purpose a disk 26 is fastened to the end of drum 18 which may engage one of the contacts 27 and 28 causing the motor to turn in one direction or the other. During operation, when the drum is shifted in its bearings, the speed of the tool post is regulated in the desired way, because the motor 29 is switched off if the speed is too high, and it is immediately switched on if the speed is too low.

The device may be modified in different ways, so for instance the drum 18d may be connected with a sliding contact cooperating with a changing resistance for altering the speed of the electric motor.

What we claim is:

1. In a regulating device for servo-motors for controlling machine tools having pulley means rolling on a rotated drum means with one of said two means being shifted by the servo-motor in a crosswise direction to the plane of rotation of the said pulley means, the plane of rotation of the pulley means being adjustable independently of the function of the servo-motor in an inclined position corresponding to the resultant of the said shifting movement and of the circumferential speed of the drum means, enabling the pulley means to roll without gliding on the drum means, and means for altering the power of the servo-motor, said last mentioned means being influenced by the shifting movement of one of the first mentioned two means caused by the friction generated between the said two means when the plane of rotation is turned by an outside effect.

2. In a regulating device for hydraulic servo-motors, a piston movable by the pressure of the hydraulic fluid, a pulley rolling on a rotated drum and being shifted by the said piston parallelly to the axis of rotation of the said drum, the plane of rotation of the pulley being adjustable independently of the function of the servo-motor in an inclined position corresponding to the resultant of the said shifting movement and the circumferential speed of the said drum enabling the pulley to roll without gliding on the drum, the drum being movable axially in its bearings by means of the frictional forces produced when the said resultant speed changes its direction, and means influenced by the said axial movement of the drum for changing the pressure of said hydraulic fluid.

References Cited in the file of this patent

UNITED STATES PATENTS

| | | |
|---|---|---|
| 2,278,396 | Saur | Mar. 31, 1942 |
| 2,329,216 | Peters | Sept. 14, 1943 |
| 2,372,428 | Johnson | Mar. 27, 1945 |
| 2,480,403 | Ferris | Aug. 30, 1949 |